United States Patent

Bohnet et al.

[11] Patent Number: 5,720,583
[45] Date of Patent: Feb. 24, 1998

[54] CUTTING BIT, IN PARTICULAR INDEXABLE CUTTING BIT

[75] Inventors: Siegfried Bohnet, Mössingen; Hans Peter Dürr, Gomaringen-Stockach, both of Germany

[73] Assignee: Walter AG, Tübingen, Germany

[21] Appl. No.: 764,646

[22] Filed: Dec. 11, 1996

Related U.S. Application Data

[63] Continuation of Ser. No. 410,815, Mar. 27, 1995, abandoned.

[30] Foreign Application Priority Data

Apr. 1, 1994 [DE] Germany ............ 44 11 475.3

[51] Int. Cl.$^6$ ............................ B23C 5/20
[52] U.S. Cl. .............. 407/42; 407/114; 407/113
[58] Field of Search ........................ 407/113, 114, 407/34, 40, 53, 61

[56] References Cited

U.S. PATENT DOCUMENTS

| | | |
|---|---|---|
| 3,818,562 | 6/1974 | Lacey . |
| 5,007,775 | 4/1991 | Pantzar . |
| 5,199,827 | 4/1993 | Pantzar . |
| 5,232,319 | 8/1993 | Satran et al. . |
| 5,388,932 | 2/1995 | DeRoche et al. ............ 407/113 |

FOREIGN PATENT DOCUMENTS

| | | |
|---|---|---|
| 0 392 729 A2 | 10/1990 | European Pat. Off. . |
| 0 392 730 A2 | 10/1990 | European Pat. Off. . |
| 22 59 108 | 6/1973 | Germany . |
| 36 18 574 A1 | 12/1986 | Germany . |
| 36 00 077 | 4/1987 | Germany . |
| 38 03 188 | 8/1988 | Germany . |

OTHER PUBLICATIONS

"Sandvik Coromant Fräswerkzeuge", D–8200:3, pp. 40–41.

*Primary Examiner*—Daniel W. Howell
*Assistant Examiner*—Mark Williams
*Attorney, Agent, or Firm*—Frishauf, Holtz, Goodman, Langer & Chick, P.C.

[57] ABSTRACT

A cutting bit, in particular an indexable cutting bit, has a polygonal base body with a flat bottom side (1), a flat or structured top side (4) spaced apart from the bottom side, and a number of side surfaces (2) adjoining one another, forming corners (3). On the top side, the base body is beveled to descend in the outward direction of the region of the chip removing surface at at least one corner (3), in such a way that at the corner a delimited region (9) is formed that is inclined with respect to the bottom side (1). In this inclined region (9), on one side of the corner (3), the main cutting edge (5a, 5b) extends to the vicinity of the corner (3), while on the other side of the corner in the inclined region a plane, or facing, cutting edge (5c) is formed, which essentially adjoins the main cutting edge, and the portion of the main cutting edge located in the inclined region (9) has essentially at most the same length as the plane cutting edge.

37 Claims, 8 Drawing Sheets

CUTTING BIT, IN PARTICULAR INDEXABLE CUTTING BIT

This application is a continuation of application Ser. No. 08/410,815, filed Mar. 27, 1995, now abandoned.

Reference to related patents, the disclosures of which are hereby incorporated by reference:

U.S. Pat. No. 5,199,827, Pantzar
U.S. Pat. No. 5,007,775, Pantzar
U.S. Pat. No. 3,818,562, Lacey
U.S. Pat. No. 5,232,319, Satran et al.

Reference to related disclosures:

European 0 392 729 A2, Satran
European 0 392 730 A2, Satran
German 22 59 108, Bennett.

FIELD OF THE INVENTION

The invention relates to a cutting bit, in particular an indexable cutting bit (ICB), particularly of hard metal, and a rotary material-cutting or chip-removing tool, especially a drilling or milling tool, equipped with such cutting bits.

BACKGROUND

For machining metal workpieces, in which it is important to generate a precisely defined angle—as a rule 90°—between the cutting face on the workpiece and the edge facing surface, so-called corner, or edge milling cutters are used, which in practice are often equipped with triangular or diamond-shaped ICBs. The number of successive cutting main cutting edges is accordingly limited to three and two, respectively. If there are two sequentially cutting main cutting edges, then a rectangular ICB is also formed, which is known from European Patent Disclosures EP 0 392 729 and EP 0 392 730 A2, and in which the main cutting edge is curved with an obliquely inclined plane in accordance with the cutting line of an imaginary cylinder that contains the theoretical circle described the tip of the tool, so that the cutting angle and the clearance angle, in the installed position, are essentially constant over the entire length of the cutting edges. In this indexable cutting bit, cutting edge portions with a relatively small associated wedge-shaped angle occur in the corner region, and as a consequence the corner regions threaten to break under heavy loads. Another version uses a negative axial angle in the vicinity of the tool face, which is undesirable both from the standpoint of chip formation and guidance and of the occurrence of strong axial forces.

From U.S. Pat. No. 5,199,827, an indexable cutting bit with a square bottom side is known; it has four sequentially usable main cutting edges and is intended for use with a positive axial angle and a negative radial angle in the tool body of a corner or edge milling cutter. Each main cutting edge in this ICB is assigned an auxiliary or plane cutting edge, which adjoins the respective main cutting edge via a portion of a corner cutting edge. The arrangement is made such that at each of the corners, one auxiliary cutting edge and one main cutting edge form an angle that is greater than 90°.

In the installed state, these indexable cutting bits use with a relatively large negative radial angle. In order nevertheless to achieve a position cutting angle in the installed state, the chip bowl, or depression, of the ICB must be formed accordingly; as a consequence, there is a relatively weak cutting edge with deep chip bowls on the ICBs themselves. Reinforcement ribs must therefore be provided, in the corner region among others.

An ICB is also known from European Patent Disclosure EP B1 0 358 623, and the equivalent U.S. Pat. No. 5,007,775, in which the chip release surface, located in a plane, is provided with a beveled face that extends along at least one main cutting edge and that in principle is curved helically, such that the angle of inclination at the corner, measured toward a center plane, is greater than at a distance from the corner. The face that is beveled in strips extends from an auxiliary cutting edge at the corner over at least half the length of the associated main cutting edge. Its width is equivalent to the length of the auxiliary cutting edge oriented crosswise to it. The beveled face extending over a majority of the length of the main cutting edge worsens the cutting conditions, however, since with respect to the chip release surface parallel to the bearing face, greater angles of inclination occur in the beveled region, and they result in a reduction in the cutting angle, with the consequence that greater cutting forces and hence increased chip-removing work ensue.

THE INVENTION

It is an object of the invention to create a preferably square or rectangular cutting bit, in particular an indexable cutting bit for a rotary milling cutter, in which without a noticable increase in the cutting capacity, areas threatened with breakage particularly in the corner regions are avoided; this allows an embodiment with four sequentially usable main cutting edges and results in an excellent surface quality even on the flat side. The milling cutter should be able to form a shoulder on a workpiece, with exactly defined angular relationships, and in particular a precisely 90° shoulder.

Briefly, the flat base body of the novel cutting bit preferably has a flat, rectangular or square bottom side and a flat or structured top side spaced apart from it, as well as a number of side faces adjoining one another at the four corners of the base body. On the periphery of the base body there are at least one main, or major cutting edge and one plane, or end facing cutting edge, which may be toward a minor cutting edge, each of which extends over part of the periphery of the base body and is delimited on the top side and on the side faces respectively by chip release surfaces and clearing surfaces or chip On the top side, the base body is beveled so that it descends outwardly on at least one corner, such that a delimited region inclined relative to the bottom side is formed at the corner. In this inclined region, the associated main or major cutting edge extends into the region of the corner on one side of that corner. The portion of the main cutting edge located in the inclined region is substantially shorter than (less than half the length of) the portion of the same main cutting edge located outside this region. Since the beveled region is concentrated practically only in the immediate region of the corners that is most severely strained in the chip removing process and therefore is the most threatened with breakage, it has only a negligibly slight influence on the chip removing capacity. In the novel cutting bit, consistently good cutting conditions are therefore achieved over virtually the entire length of the main cutting edge. On the other side of the corner, the plane or facing edge is formed in the inclined region, essentially adjoining the main cutting edge.

In end-milling, the novel cutting bit uses an end facing or auxiliary, or minor or finishing cutting edge, so that a good surface on the machined workpiece is assured. It enables making a genuine, accurate 90° shoulder on the workpiece, avoiding cutting edge portions with a smaller cutting edge support base in the region of the corner radii and thus assuring great strength and a long service life. The beveling in fact brings about a reduction in the axial angle in the corner region, in other words at the point where there is an increased danger of breakage. At the same time, the normal axial angle, chosen to be especially suitable for the chip removal, is maintained in the portion of the main or major cutting edge located outside the inclined region, which portion extends over the greater majority of the cutting width.

In accordance with a feature of the invention, with this novel tool equipped with these cutting bits, the bits are inserted with a positive axial angle and a negative radial angle. The portion of the effective main cutting edge located in the inclined region has a smaller axial angle than the portion extending outside that region. The auxiliary, or minor or plane cutting edge formed by the inclined region, for the effective main, or major cutting edge in use, is oriented flat to the milled surface of the workpiece in the end milling, while the adjoining main cutting edge not in use extends away from the surface of the workpiece at an angle, so that it does not engage the workpiece surface.

The novel tool makes it possible to produce a genuine 90° shoulder on the workpiece; deviations from the right angle can either be avoided entirely or reduced to a minimum that is satisfactory for a particular intended use. At the same time, however, the cutting bits can be formed as genuine ICBs with four sequentially usable cutting edges, making for correspondingly high efficiency.

It is to be noted that although as a rule all four corners of the novel cutting bits are provided with the beveling mentioned, resulting in an ICB with annularly encompassing cutting edges, cases may also occur in which in view of the demands of the particular intended use, only one or two corners of the cutting bit, for instance, are beveled.

At least one cut chip breaking, or chip forming recess, or depression, associated with the respective cutting edge may be provided in the top side of the novel cutting bit, to thereby form a structured or profiled surface, but the invention also encompasses embodiments in which the top side of the bit is flat.

DRAWINGS

Figure 1:
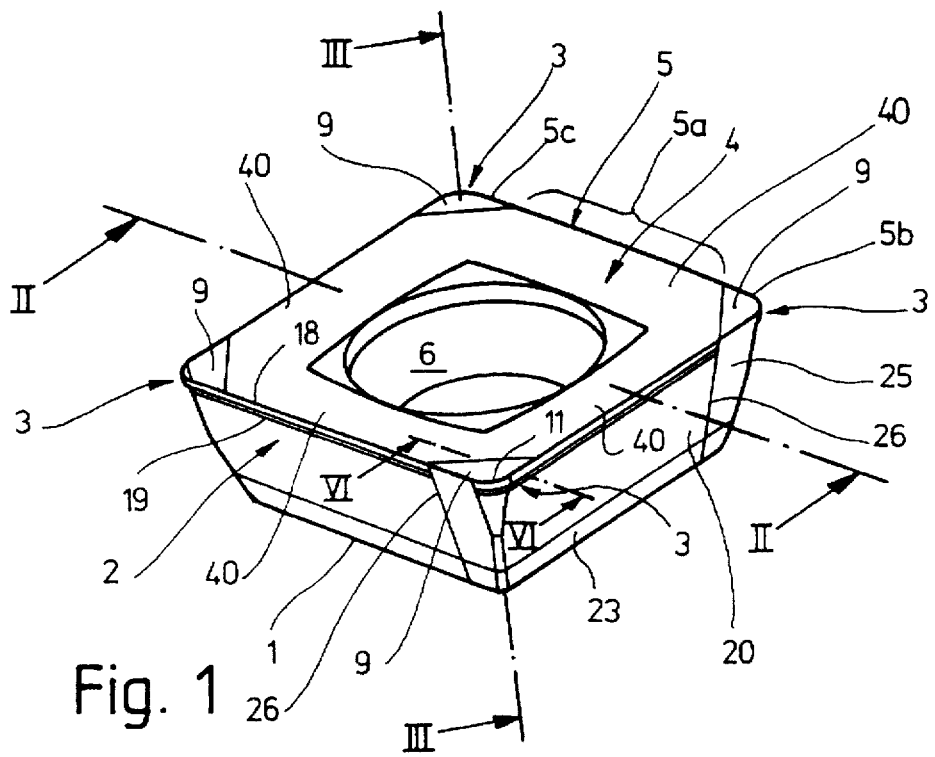
FIG. 1 is a perspective view of a first embodiment of an indexable cutting bit or ICB according to the invention.
Figure 2:
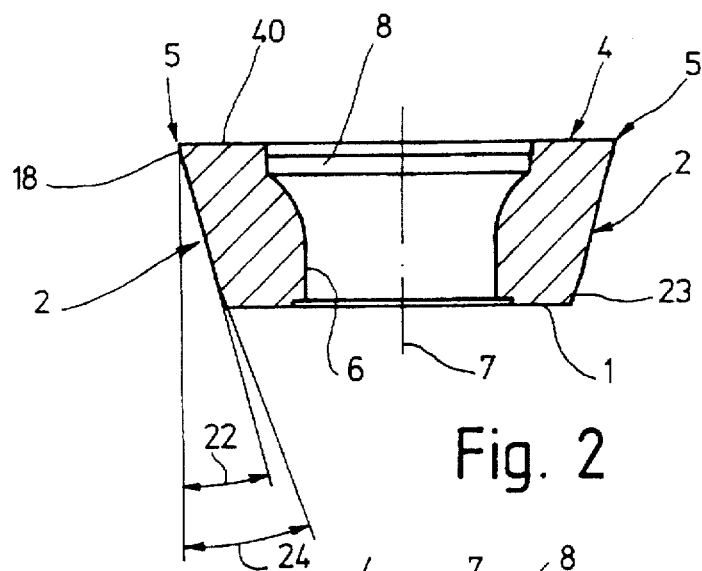
FIG. 2 is a side view on a different scale of the ICB of FIG. 1, in section taken along the line II—II of FIG. 1.
Figure 3:
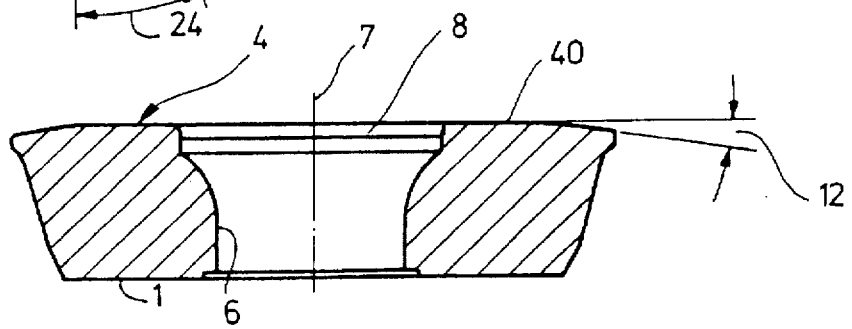
FIG. 3 is a side view on a different scale of the ICB of FIG. 1, in section taken along the diagonal line III—III of FIG. 1.
Figure 5:
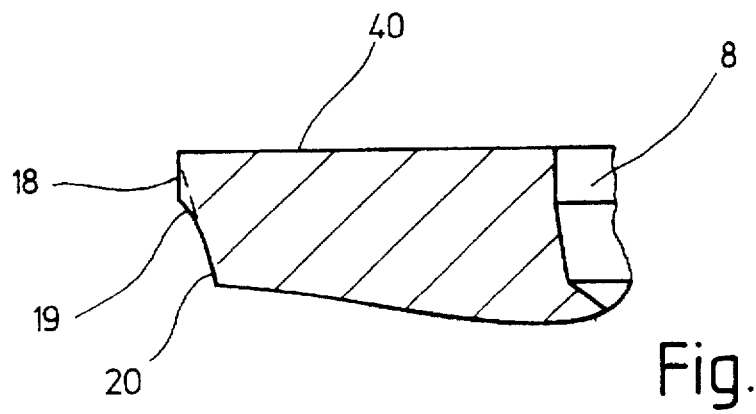
Figure 6:
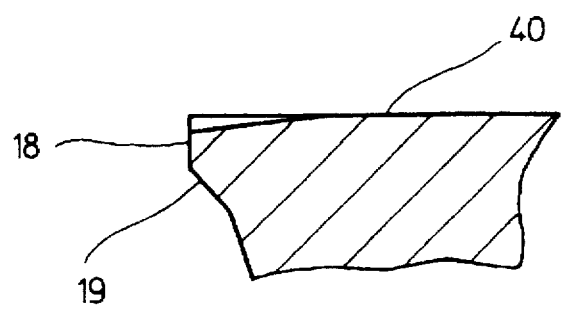
Figure 7:
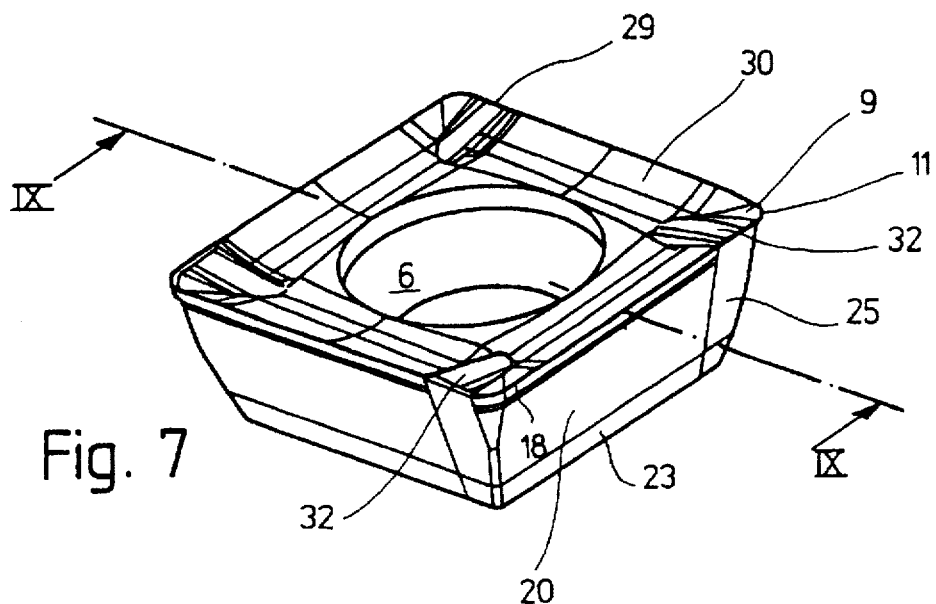
Figure 8:
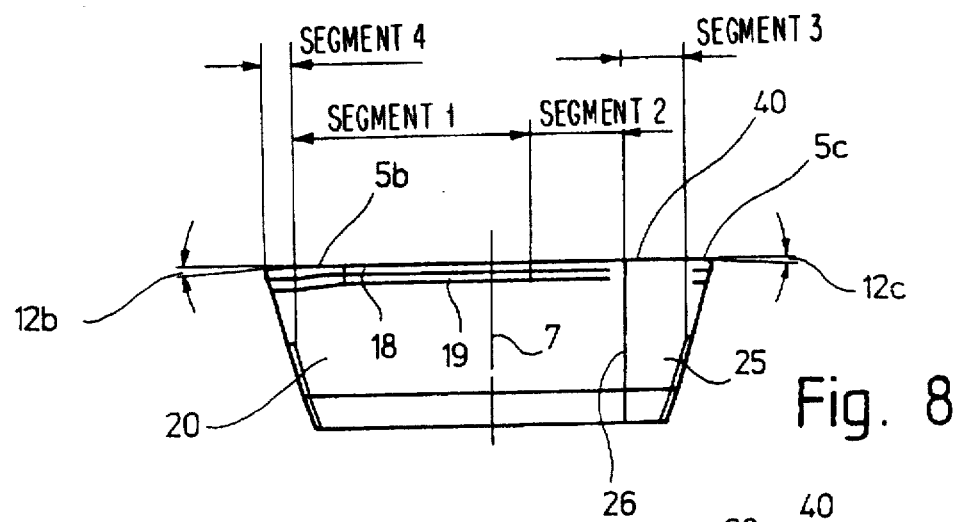
Figure 9:
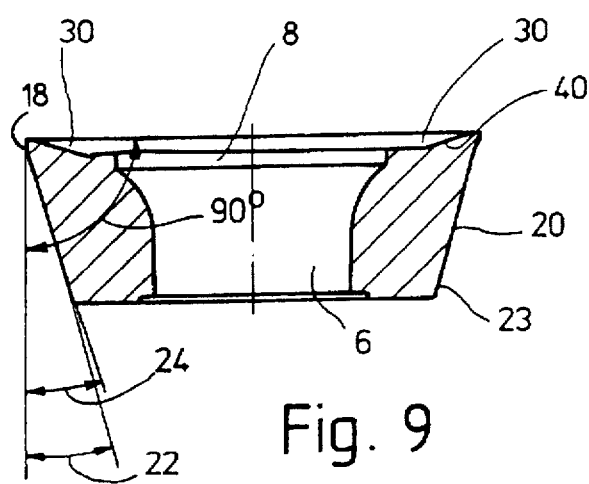
Figure 10:
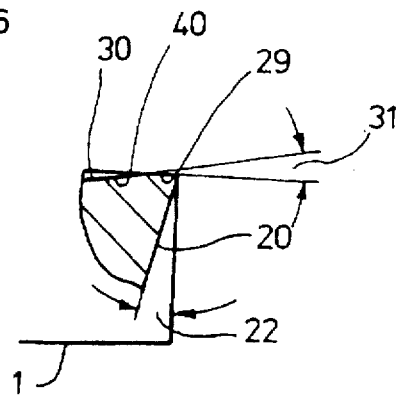
Figure 11:
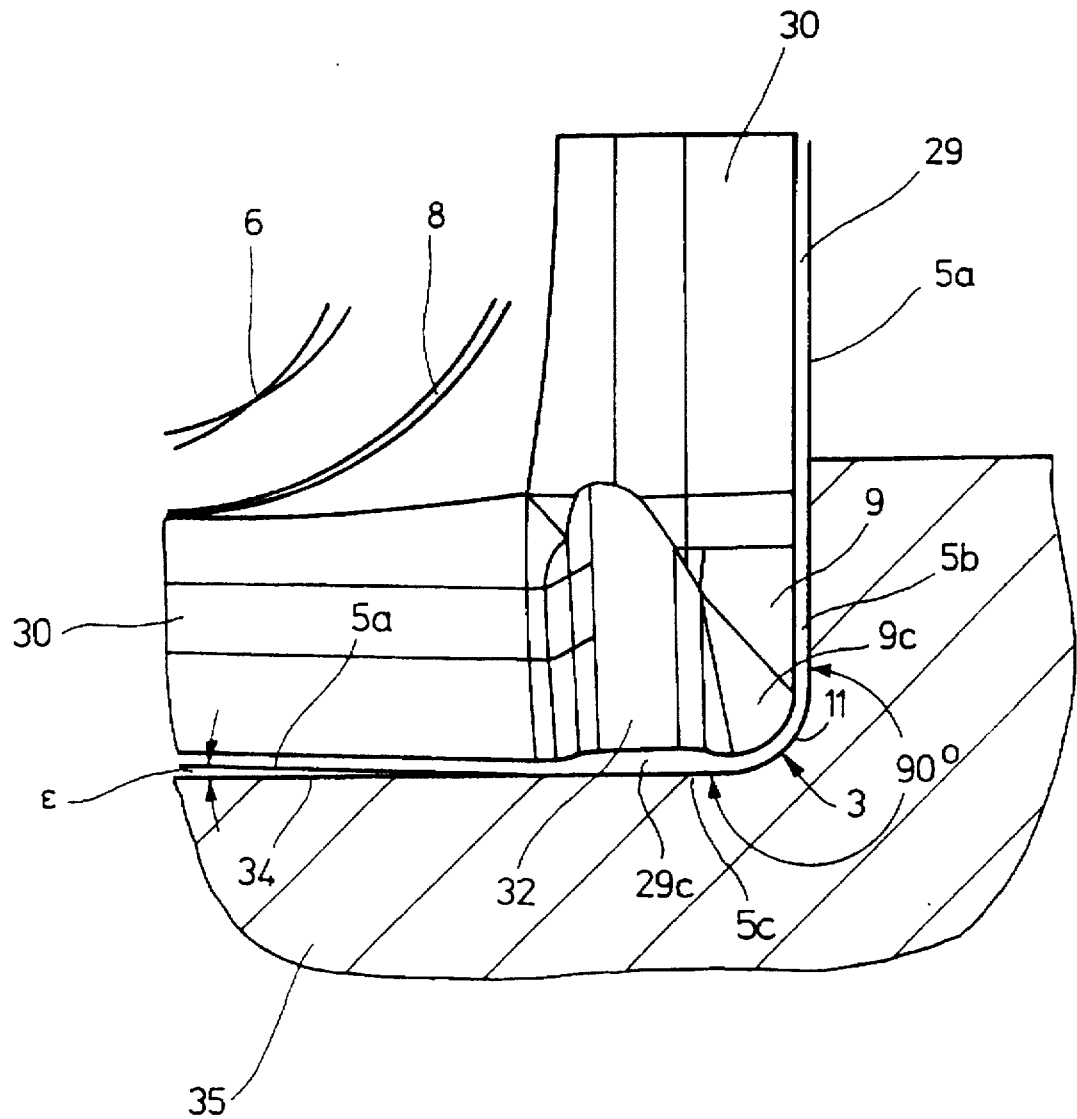
Figure 12:
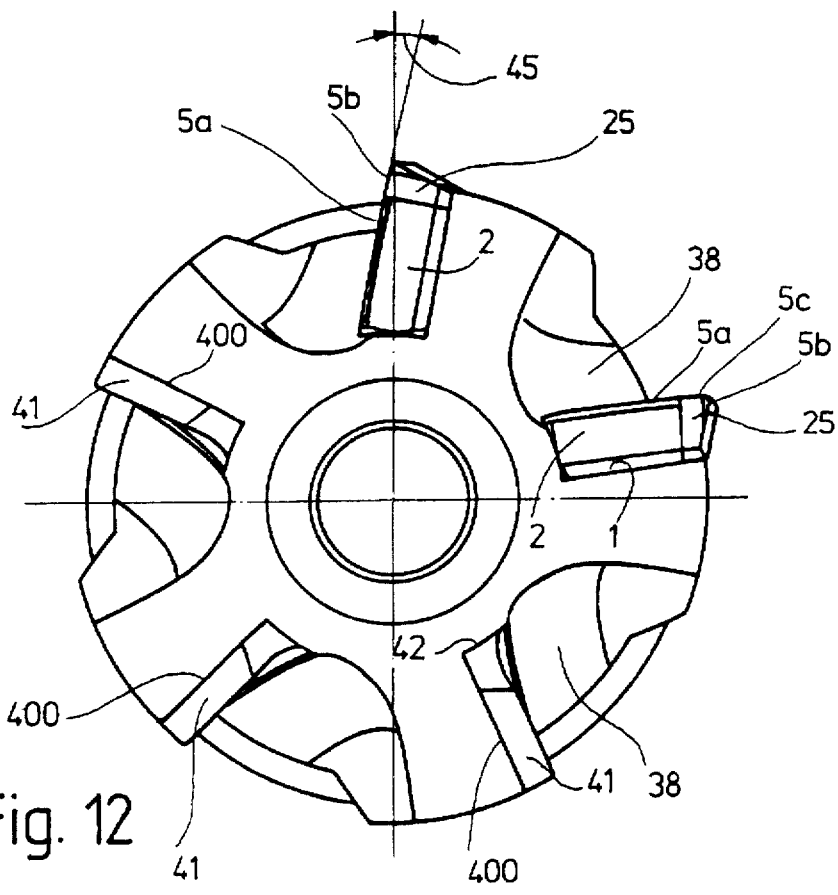
Figure 13:
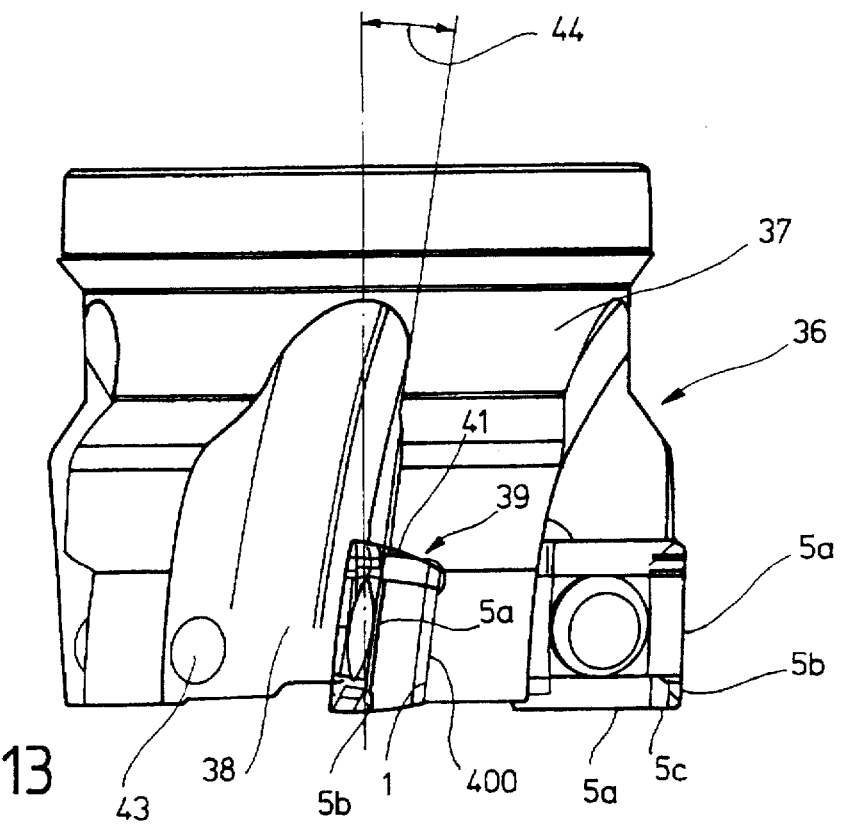
Figures 14, 15:
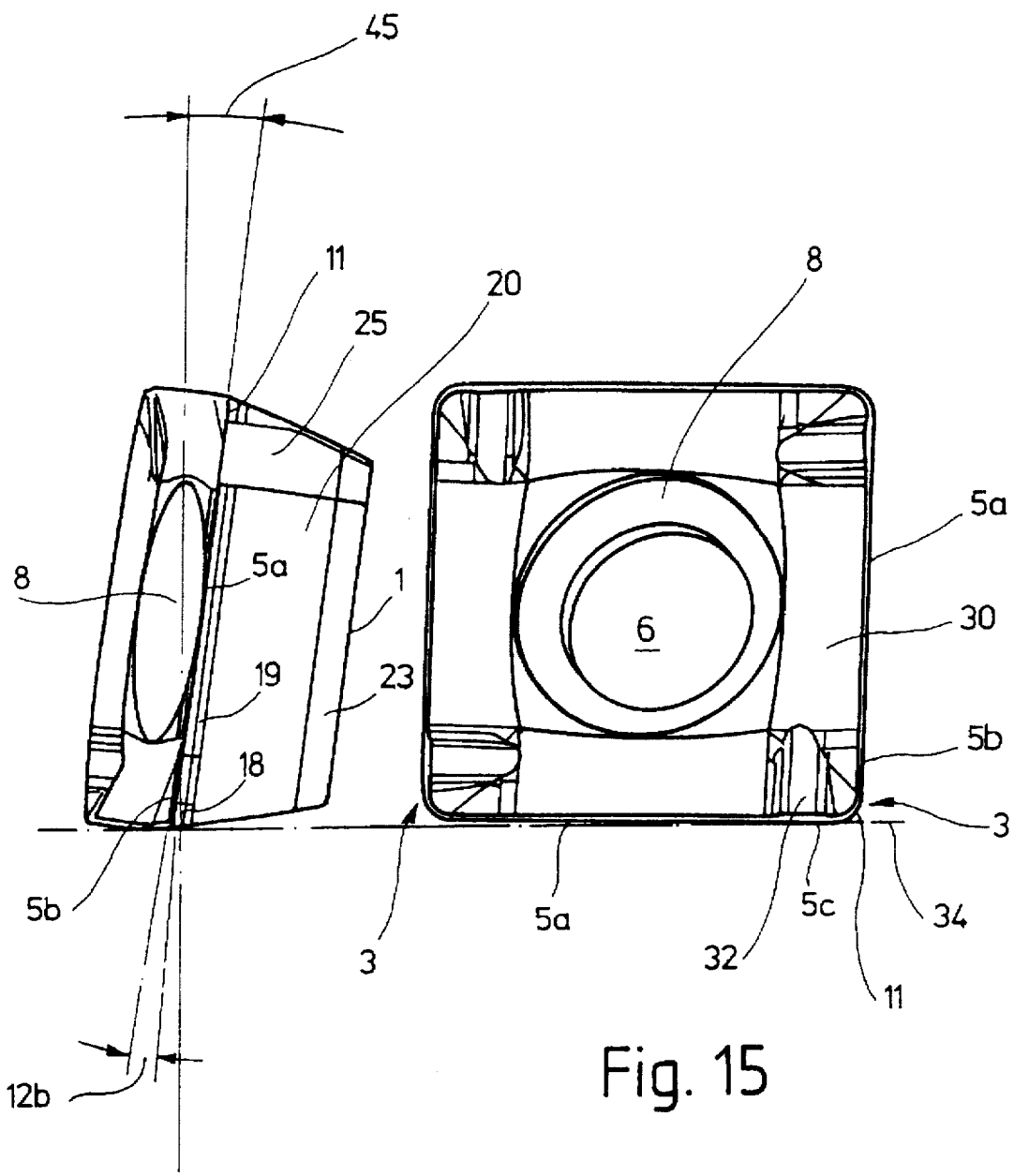
Figure 16:
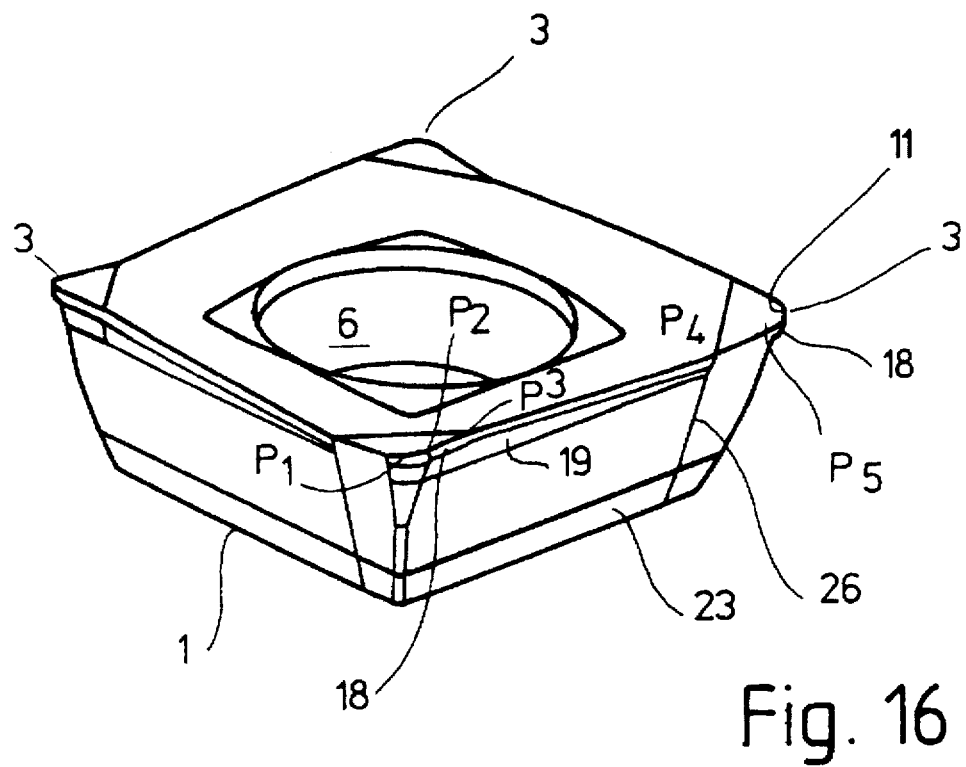
Figure 17:
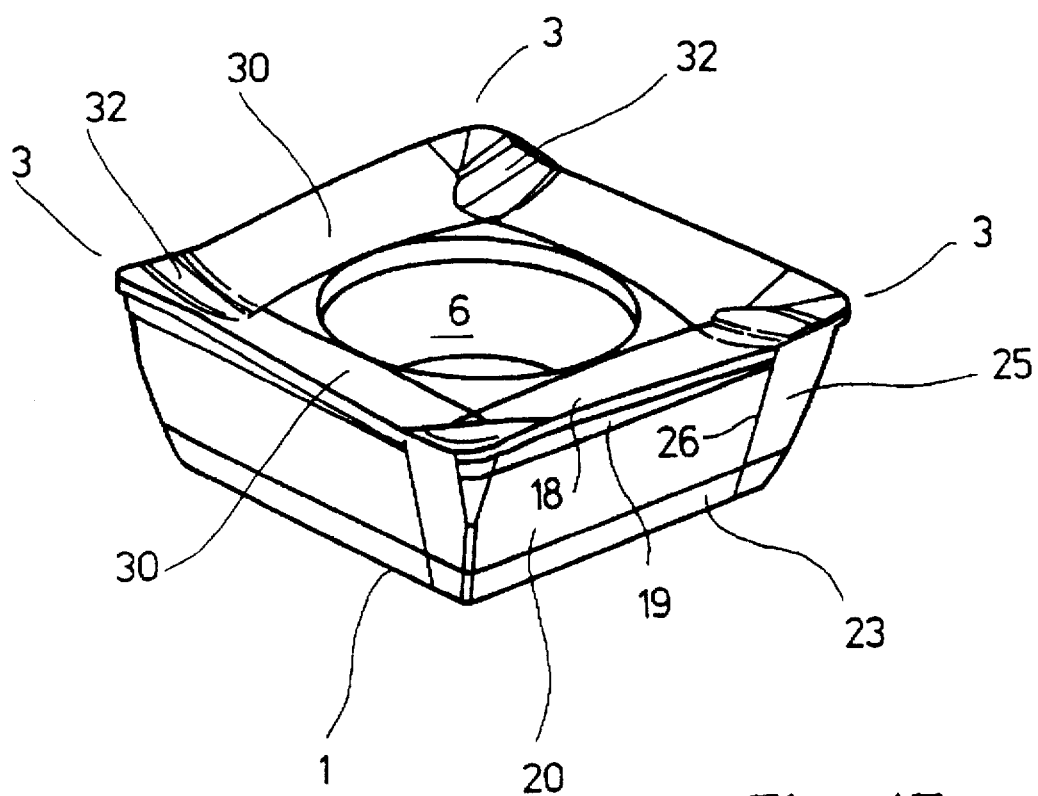
Figure 18:
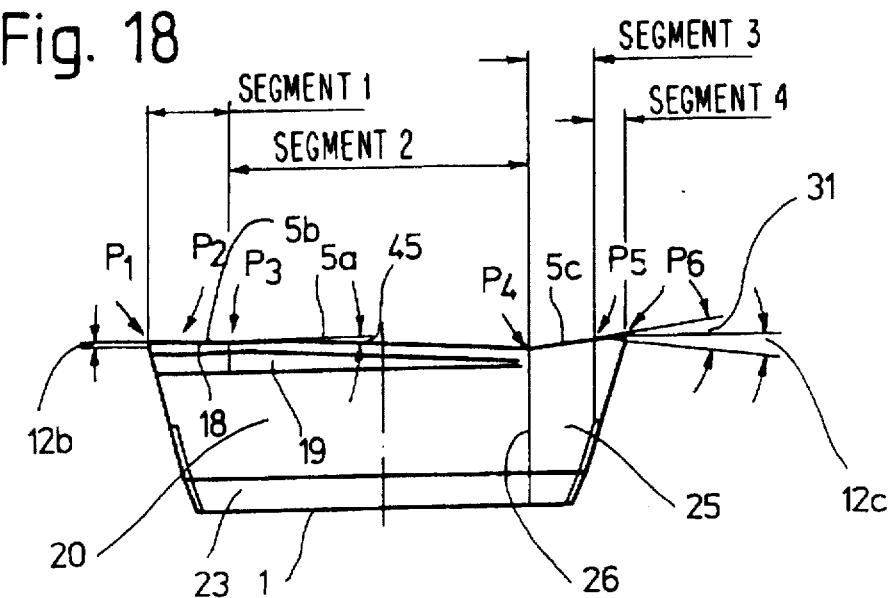
Figure 19:
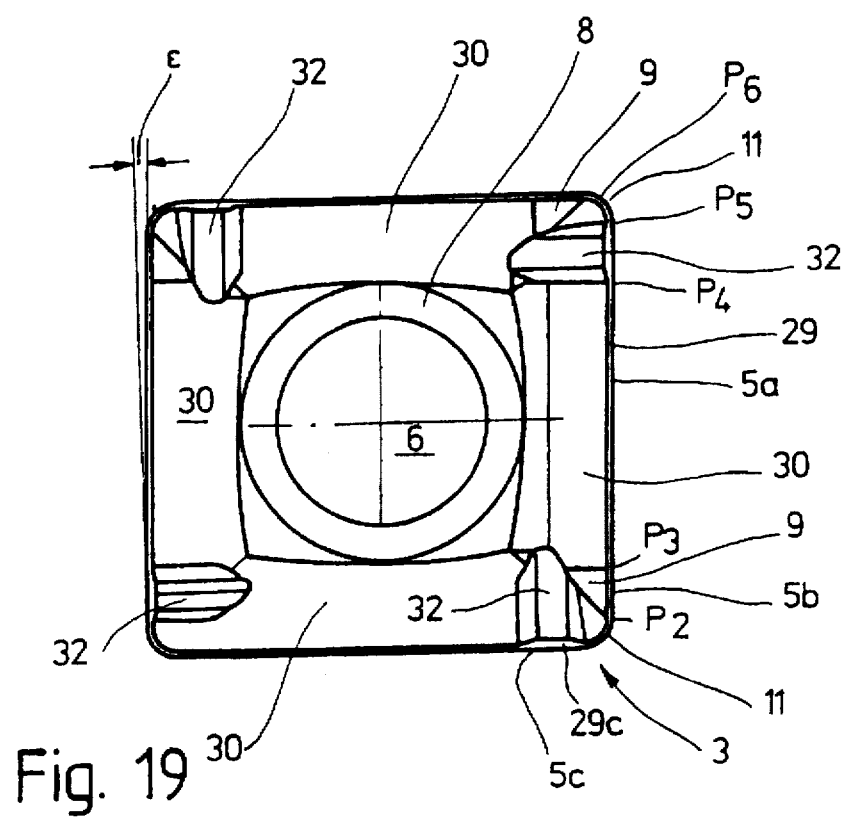

FIG. 5 in a view similar to FIG. 2, on a larger scale, shows a detail of the ICB of FIG. 2;

FIG. 6 is a side view, corresponding to FIG. 5, of a detail of the ICB of FIG. 1, in section along the line VI—VI of FIG. 1;

FIG. 7 is a perspective view of an ICB according to the invention in a second embodiment;

FIG. 8 is a side view on a different scale of the ICB of FIG. 7;

FIG. 9 is a side view of the ICB of FIG. 7, in a section taken along the line IX—IX of FIG. 7;

FIG. 10 is a corresponding side view on a larger scale on the detail of the ICB of FIG. 9;

FIG. 11 is a top view on a detail, on a larger scale, of a corner region of the ICB of FIG. 7, showing its association with a machined workpiece shown in section;

FIG. 12 is a top view of the face end of a corner milling cutter, according to the invention, equipped with ICBs of FIGS. 7–10;

FIG. 13 is a schematic side view of the corner milling cutter of FIG. 12;

FIGS. 14 and 15 are schematic side views corresponding to FIG. 13 of the ICB of FIG. 7, in its installed state in the corner milling cutter of FIGS. 12–13, in two different perspective positions;

FIG. 16 is a perspective view of a third embodiment of an ICB according to the invention;

FIG. 17 is a perspective view of a fourth embodiment of an ICB according to the invention;

FIG. 18 is a side view of the ICB of FIG. 17; and FIG. 19 is a top view of the chip release surfaces of the ICB of FIG. 17.

DETAILED DESCRIPTION

The cutting bit shown in a first simple embodiment in FIGS. 1–6 is in the form of an indexable cutting bit, or ICB. Like the embodiments described hereinafter as well, it comprises hard metal, cutting ceramic or some other suitable cutting material. It is in the form of a positive cutting bit, with a base body fundamentally shaped like a truncated pyramid, whose smaller face forms the flat bottom side 1 of the ICB. The bottom side 1 is square; it is encompassed by four side surfaces 2, each inclined outward by the same angle, which adjoin one another, forming four corners 3. The top side 4 of the ICB, which is spaced apart from the bottom side 1 as can be seen from FIG. 1, is formed as a flat surface 4 parallel to the bottom side 1; its cutting lines and the side faces 2 form peripheral cutting edges 5 surrounding the circumference all the way around.

The ICB is in the form of a perforated bit with a continuous cylindrical hole 6, whose axis 7 (FIG. 2), extending at right angles through the bottom side 1, passes through the diagonal intersecting point of the bottom side. In the region of the top side 4, the hole 6 is widened radially outward at 8 to match the shape of the head of the chucking screw, as is known per se.

The cutting edges 5 are delimited by chip release surfaces on the top side 4 and by clearing surfaces on the side surfaces 2; the form and location of these faces will be described in detail hereinafter.

In the region of the four corners 3, the base body of the ICB is beveled in descending fashion outward on the top side 4, such that at each of the corners 3, a delimited region 9 that is inclined relative to the bottom side 1 is formed; the delimited region has an essentially triangular shape. The inclined region 9 in this embodiment is delimited toward the top side 4 by a flat surface that is oblique relative to the bottom side 1, and it extends on both sides of the angle bisector, shown at 10 in FIG. 4, of the respective corner 3. It intersects the clearing surfaces, provided on the side faces 2 adjoining one another at a given corner, forming two cutting edges 5b, 5c, which are inclined relative to the bottom side and of which the cutting edge 5b on one side of the corner 3, together with the longer portion 5a adjoining it of the cutting edge 5 associated with this side of the base body forms the respective main, or major cutting edge, while the cutting edge 5c extending on the other side of the corner 3, and forming an obtuse angle in top view with the cutting edge 5*b*, acts as the auxiliary, or minor or plane cutting edge associated with the main, or major cutting edge 5*a*, 5*b*. The length of the portion 5*b* of the main cutting edge located in the inclined region 9 is essentially equal to the length of the associated minor, or auxiliary or plane, or end facing, cutting edge 5*c*. This main, or major cutting edge portion 5*b* extends over a length that is from 15 to 30%, and preferably approximately 20%, of the total length of the main cutting edge 5*a*, 5*b*.

Figure 4:
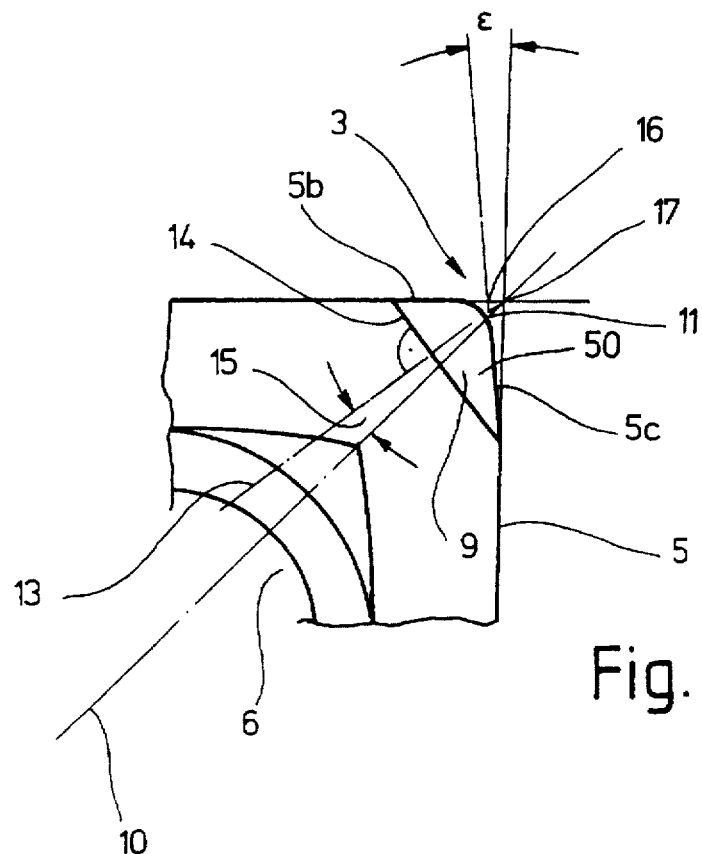
FIG. 4 shows a detail in top view, on a different scale, of a corner region of the ICB of FIG. 1.

Thus at each of the corners 3, the main cutting edge 5*a*, 5*b* extends by its portion 5*b* into the inclined region 9, which at the corner itself is rounded at 11, in the manner visible from FIG. 4, with a corner radius whose corresponding circumferential edge joins the two cutting edges 5*b*, 5*c* to one another without any break.

The auxiliary or plane cutting edge 5*c* is straight as a rule, but it may also be slightly curved, bulging outward, in a region indicated at 50 in FIG. 4, in order to provide the workpiece with a good surface property of the cut face even if there are slight fluctuations in tolerance in the angle ∈. The inclined region 9 and the bottom side 1, or a face parallel to it, form an angle of inclination of between 1.5° and 30°. Preferably, the angle of inclination is in the range from 2° to 8°. This angle of inclination is marked 12 in FIG. 3.

In principle, the inclined region may be symmetrical with the angle bisector 10 of the associated corner 3, but often it is practical to twist it, that is, shift it rotationally, to the side somewhat relative to the angle bisector 10, so as to attain a different length of the two cutting edges 5*b*, 5*c* defined by it. FIG. 4 shows that the vertical 13 to the side 14 of the triangle opposite the corner 3 and the angle bisector 10 form an acute angle 15, which in the exemplary embodiment shown is approximately +8°, and which in principle can be in the range between 0° and ±60°, preferably approximately ±15°.

If the length and the inclination relative to the bottom side 1 of the two cutting edges 5*b*, 5*c* defined by the inclined region 9 are to meet the requirements of a particular use, then the surface delimiting the inclined region 9 at the top can also be tilted about the angle bisector 10 of the corner. The sides of the triangle that delimit the inclined region 9 intersect, opposite the side 14 (FIG. 4), at a point 16 that can be located on the (theoretical) cutting line of the two side surfaces 2 that form the corner 3. The conditions may, however, also be chosen such that as shown in FIG. 4, the intersection 6 of these cutting edges is not located on this cutting line.

It is also conceivable for the inclined region 9, in the region of the top side 4, to be delimited by a curved surface, for instance a concave or convex surface, and it is also conceivable for its surface to be composed of a plurality of partial surface regions which for instance abut one another along the angle bisector 10, and which may also be tilted and twisted relative to one another.

In this way, special forms of the main, or major cutting edge portion 5*b* located inside the inclined region and/or the associated minor, or auxiliary or plane cutting edge 5*c* can be attained. Since the lengths of portion 5*b* of the main cutting edge and of the minor cutting edge and of the minor cutting edge 5*c* are essentially equal, minor cutting edge 5*c* is entirely within the inclined region 9 (see FIG. 4). While in the exemplary embodiment shown, the portion 5*a* of the main cutting edge located outside the inclined region 9 is straight and is oriented parallel to the bottom side 1, the invention also relates to ICBs of the kind in which the base body is delimited by slightly curved side surfaces 2, in such a way that at the top, for instance, a convex embodiment of the main cutting edge portions 5*a* and/or 5*b* is brought about. The main cutting edge portion 5*a* may also be inclined in side view from the bottom side 1, or may be embodied as curved in general, as will also be described in detail hereinafter.

The cutting edges 5—in other words 5*a* and 5*b*—and 5*c* are, as already noted, defined by chip release surfaces and clearing surfaces. Since in the embodiment of FIGS. 1–6, the ICB has no chip bowls or recesses, the chip release surfaces are formed directly by the flat surface that forms the top side 4. The chip release surface associated with each main cutting edge portion 5*a* is marked 40 in FIGS. 1–3. For the main cutting edge portion 5*b*, the chip release surface is located in the respective inclined region 9, and this is also the case for the associated auxiliary or plane cutting edge 5*c*.

The clearing surface located in the side surface 2 oriented toward the respective cutting edge is subdivided into a plurality of portions:

As seen particularly in FIGS. 2–6, a first hemlike clearing surface region 18 extends over the length of each of the main cutting edge portions 5*a* and the associated main cutting edge portion 5*b*; its height in the direction of the hole axis 7 is typically several tenths of a millimeter (approximately 0.2 to 0.8 mm), and as can be seen from FIG. 2 it has the clearance angle 0°, or in other words extends at right angles to the bottom side 1. A deviation to a slightly positive or a slightly negative clearance angle is conceivable. The width of the hemlike clearing surface region, measured at right angles to the main cutting edge portions 5*a*, 5*b*, is constant.

This hemlike first clearing surface region 18 is adjoined, via a striplike second transition region 19 that protrudes inward, by a third clearing surface region 20 (FIGS. 5, 6), whose clearance angle is basically the size usual for such ICBs, typically approximately 15°. The clearance angle of this region is indicated at 22 in FIG. 2.

This region is adjoined, toward the bottom side 1, by a fourth narrow clearing surface region 23, whose clearance angle 24 (FIG. 2) is somewhat larger than the clearance angle 22 of the adjacent region 20; typically, it is approximately 20°.

As can be seen from FIG. 4, in the region of each of the corners 3, the clearing surface region 25 (see FIG. 1) immediately adjoining the corner line 17 and containing the plane or auxiliary cutting edge 5*c*, is tipped inward by relative to the adjoining clearing surface region 20 of the associated side surface 2 by a small angle ∈, which is preferably on the order of 0.2° to 2°. The angular range is at most between the limits of 0.1° and 6°. The resultant edge in the associated side surface 2, beginning at the end point of the auxiliary or plane cutting edge 5*c*, is shown in 26 in FIG. 1. The first clearing surface region 18 also ends at it, or in its vicinity, so that in the region of the auxiliary or plane cutting edge 5*c*, at each of the corners 3, the associated plane surface 25 extends from the portion 23 in the vicinity of the bottom side 1 as far as the auxiliary or plane cutting edge 5*c*. The clearance angle here is as large as in the adjoining clearing surface region 20. That is, it is equivalent to the clearance angle 22 of FIG. 2 and is typically approximately 15°.

Because of the oblique position of the inclined region 9, the (imaginary) intersection 16 of the two edges 5*b*, 5*c* that delimit the inclined region 9 in each of the corners 3 regresses toward the hole axis 7, compared with the theoretical intersecting edge 17 of the associated side surfaces 2 (FIG. 4).

In order to compensate for any slight error in shape resulting from this at the shoulder to be made in the workpiece if the ICB operates with an axial angle other than 0° for the main cutting edge portion 5b, then the hemlike first clearing surface region 18 in the inclined region 9, in which it follows the oblique main cutting edge portion 5b, can be formed as protruding somewhat more markedly outward, as can be seen from a comparison of FIGS. 5 and 6. In other words, the region formed in the region 18, protruding outward in cantilevered fashion beyond the region 20, becomes somewhat larger toward the corner 3, measured in its width parallel to the bottom side 1. Elsewhere, it extends annularly around the radius of the corner, as can be seen from FIG. 1, and ends adjacent to the associated auxiliary or plane cutting edge 5c.

The increase in the first clearing surface region 18 from the beginning of the inclined region 9 (at the side 14 of the triangle in FIG. 4) to the beginning of the corner radius 11 is as a rule on the order of magnitude of a few hundredths of a millimeter, typically approximately 3/100 mm. Because of the hemlike region 14 (having the clearance angle of 0°), the clearance angle in the portions 5a, 5b of the main cutting edge is in each case smaller than in the clearing surface region 25 of the associated auxiliary or plane cutting edge 5c. Embodiments are also conceivable, however, in which the clearance angle in the region of the main cutting edge 5a, 5b is equal to or greater than in the region of the auxiliary cutting edge 5c, or in which the main cutting edge portions 5a, 5b have clearance angles different from one another.

As already noted, the auxiliary or plane cutting edge 5c, because of the special embodiment of the inclined region 9, is also longer than the main cutting edge portion 5b at the applicable corner 3.

While in the embodiment of FIGS. 1–6 described above the top side 4 of the base body is formed by a flat surface parallel to the bottom side 1 and containing the chip release surfaces 40, in FIGS. 7–11 an embodiment is illustrated in which chip bowls or chip forming recesses, or depressions, or chip grooves are formed in the top side 4, resulting in a structured surface of the top side. This embodiment again involves a positive ICB with a square bottom side 1 and four identical, sequentially usable cutting edges 5. The base body is therefore likewise in the form of a truncated pyramid; all four corners 3 are located the same distance above the bottom side 1.

In the description of this embodiment, identical elements to those of the embodiment of FIGS. 1–6 will therefore be provided with the same reference numerals, and since the basic shape of this ICB remains the same, it will not be described again.

Once again, an inclined region 9 is present in each of the four corners 3; its inclination is chosen such that, as can be seen from FIG. 8, the main cutting edge portion 5b oriented toward the applicable corner 3 is inclined outward by an angle of approximately 3° relative to the bottom side 1, or a plane parallel to it, while the inclination of the associated auxiliary or plane cutting edge 5c is approximately 2.6°, as indicated by the angles 12b, 12c in FIG. 8. The base body of the ICB is formed, adjoining the cutting edges 5a, 5b and 5c, with an uninterrupted narrow flat land, or a chamfer 29 extending all the way around; the land 29 is oriented parallel to the bottom side 1 and forms a first tip release surface portion. The width of this land is in the range of a few tenths of a millimeter and is typically approximately 15/100 mm. On each side in the region of the main cutting edge portion 5a, it is adjoined on the inside by a chip forming recess or depression 30, which adjacent to the chamfer 29 forms a chip release surface region with a cutting angle of 5° to 40°, preferably approximately 20°. The associated cutting angle is indicated at 31 in FIG. 10. In the region of each of the corners, the auxiliary or plane cutting edge 5c is assigned its own chip grooves (FIG. 7) or chip forming recess (FIG. 11) bowl 32, which with its axis is oriented approximately at right angles to the auxiliary or plane cutting edge 5c, and whose special disposition and shape can be seen clearly in FIG. 11. For the sake of clearer illustration, height lines and the orthogonal lines associated with them are shown for this purpose in FIGS. 7 and 11. As FIG. 11 shows, in the region of this chip removes recess 32, the chamfer 29 is reinforced of its wall thickness at 29c. Adjoining the bowl shaped chip forming recess 32, whose cross section is approximately U-shaped, of the auxiliary or plane, or minor cutting edge 5c, the result in each corner 3 is an approximately triangular chip release surface region 9c, delimited on the inside by the corner radius 11 of the chamfer 29; this region 9c is inclined toward the bottom of the chip removal recess 32 and it creates the transition to the chip removal recess 30 associated with the main cutting edge 5a, 5b. In the region of the auxiliary or plane cutting edge 5c, the clearing surface 25 is again pivoted inward by the small angle ε (FIG. 11), so that as can be seen from FIG. 11, when the ICB is in use, the main cutting edge of the other corner, which adjoins the auxiliary or plane cutting edge 5c of one corner 3 with its portion 5a, increasingly lifts away from the flat cutting surface 34 of the workpiece 35 and is thus kept out of engagement with the workpiece, while at the same time, the main cutting edge portions 5a, 5b that are in use create an exact 90° shoulder at 36 in the workpiece 35, as indicated in FIG. 11.

The clearing surfaces for the cutting edges 5a, 5b, 5c are fundamentally shaped similarly to those of the embodiment of FIGS. 1–6. This will be described once again in conjunction with FIG. 8, as follows:

In the segment 1 extending from the corner radius 11 and on the side of the base body in question to somewhat past the axis 7 of the hole, the clearing angle of the clearing surface region 18 adjoining the main cutting edge 5a, 5b is approximately 0°. In the segment 2 adjoining it, up to the edge 26 that defines the clearing surface region 25 of the auxiliary cutting edge 5c, the clearing surface is formed such as to form a clearance angle transition from 0° to the clearance angle 22 (typically approximately 15°).

In the clearing surface region 25 associated with the auxiliary cutting edge 5c, the clearance angle 22 is constant up to the beginning of the corner radius 11 (segment 3 in FIG. 8).

In the segment 4 adjoining it, the clearance angle transition then occurs at the corner radius 11, from the value of the clearance angle 22 to 0°, for the now adjoining hemlike clearing surface region 18 of the main cutting edge portion 5b of the other main cutting edge 5a, 5b, which in FIG. 8 extends vertically to the plane of the drawing.

The ICBs described are intended for use, in the tool body of a rotary, chip removing tool or in other words a drilling or milling tool, fundamentally in the manner illustrated in FIGS. 12–15, with a corner milling cutter equipped with the ICBs in the embodiment of FIGS. 7–11.

The corner milling cutter 36 has a substantially cylindrical tool body 37, on whose circumference uniformly distributed recesses 38 are formed that form chip grooves, each of which is associated with one ICB seat, or bit receiving seat, 39, which has one flat seat surface 400 and two lateral stop surfaces 41, 42. The particular ICB used is seated with its bottom side 1 on the seat surface 400, and it rests with its side surfaces on the stop surfaces 41, 42 in the region of the second chip release surface portions 20. In a manner known per se, it is secured by means of a tightening screw not further shown in FIGS. 12, 13 to the tool body 37, whose associated threaded bore is shown at 43 in FIG. 13.

The seat surfaces 400 are oriented such that each ICB works with a positive axial angle 44, typically approximately 6° to 12°, for its effective main cutting edge portion 5a (FIG. 13) and a negative radial angle 45 (FIG. 12), which in the exemplary embodiment shown in approximately 11.5°.

The auxiliary, or minor or plane cutting edge 5c, associated with the effective major, or main cutting edge 5a, 5b, that is, the main cutting edge that cuts on the circumference of the tool body 37, is, as can be seen from FIG. 15, located in the plane 34, while as already explained the portion 5a adjoining it of the ineffective main cutting edge associated with the plane surface 34 lifts away from the plane surface toward the axis of rotation. Since the ICB has the beveled region 9 in the region of each of the cutting corners, the main cutting edge portion 5b located in this region works with an axial angle that is smaller, by the corresponding angle of inclination of this main cutting edge portion 5b, than the axial angle 44. With the dimensions chosen in the exemplary embodiment, this axial angle is approximately 4° to 5° [approximately 8° (axial angle 45 of the main cutting edge portion 5a) minus approximately 3° (angle of inclination 12b of the main cutting edge portion 5b) equals approximately 5°]. The slight dimensional departure from 90° that still exists as a result of this small axial angle in the region of the shoulder produced in the workpiece is compensated for by a corresponding increase in thickness of the hemlike first clearing surface region 18 at the effective cutting corner (which is approximately 3/100 mm), as has already been explained in detail.

In principle, however, it is also possible to use the ICBs as such a positive axial angle and negative radial angle in the tool body 37 that, given a suitably chosen angle of inclination of the beveled region 9, opposite the bottom side of the ICB, an orientation of the effective main cutting edge portion 5b results that is parallel to the axis of rotation of the tool body; in other words, this main cutting edge portion 5b is located on a generatrix of the imaginary cylinder that contains the theoretical circle described by the cutting edges on the circumference of the tool body. If then, as already noted, the associated effective auxiliary cutting edge 5c is located in the plane surface 34, the result is a theoretically exact 90° shoulder in the workpiece, without requiring a correction that would be brought about by a change in the first hemlike clearing surface region 18.

By means of the inclined region 9, the ICBs are stabilized in the cutting corners 3 that are especially threatened with breakage, so that they provide good cutting conditions and also have a long service life.

In closing, it should also be noted that in FIG. 12 only two ICBs are shown; actually, the tool body 37 is intrinsically equipped with ICBs distributed uniformly all around its circumference, in all of its recesses 38.

Each of the square ICBs has four identically formed main, or major cutting edges 5a, 5b; each of them is assigned one minor, or auxiliary or plane cutting edge 5c, and each can be used sequentially for cutting.

The main cutting edge portions 5a of the ICBs described thus far are oriented parallel to the bottom side 1, in a side view; they are straight lines.

As already briefly mentioned at the outset, however, the main cutting edges may also be formed differently, for instance being curved or being formed as a polygonal course. An exemplary embodiment with main cutting edges in the form of polygonal courses will now be described briefly in conjunction with FIGS. 16–19, in two embodiments, one without chip removal recesses (FIG. 17) and one with chip removal recesses (FIGS. 17–19).

The fundamental structure of the ICBs of FIGS. 16–19 is identical to that of the ICBs of FIGS. 1–6 and FIGS. 7–15. Identical elements are therefore provided with the same reference numerals and will not be described again.

In ICBs of FIGS. 16–19 as well, all four corners 3 of the base body are at the same height away from the square bottom side 1, or in other words are located in a common imaginary plane oriented parallel to the bottom side 1. One inclined region 9 is again formed at each of the corners 3. The resultant angles of inclination of the main cutting edge portions 5b and of the auxiliary or plane cutting edges 5c relative to the bottom side 1 are of the same dimensions as those shown at 12b and 12c in FIG. 8 and FIG. 18.

The course of a cutting edge 5, which is continuous over one side, of the truncated pyramid base body of the ICB can be seen in FIGS. 18 and 19:

Beginning at point P2 on the end of the cutting edge region corresponding to the corner radius 11 in the associated corner 3, the main cutting edge rises over the portion 5b in the inclined region 9 up to its end at the point P3, relative to the bottom side 1. Over the adjoining portion (5a), that is, from the point P3 to a point P4 on the edge 26 that delimits the clearing surface region 25 of the next corner 3 (the one on the right in FIG. 18), the main cutting edge descends again relative to the bottom side 1, specifically by an angle that is in the range from approximately 1.5° to 8° and in the present case is approximately 3°. The two main cutting edge regions 5a, 5c are straight lines, which form a small angle ($\epsilon$) with one another (FIG. 11). From point P4, the cutting edge that now forms the auxiliary or plane cutting edge 5c of the right-hand corner in FIG. 18 rises again up to a point P5, which is located on the surface of the inclined region 9, at the beginning of the rounded corner having the radius 11. From this point P5, the cutting edge then descends again to the corner point P6 of this corner 3, which is located at the same height as the point P1 on the other end (on the left in FIG. 18) of the polygonal course that forms the corner point of this (left-hand) corner 3.

Between points P2 and P4, the two portions 5a and 5b again form the main cutting edge; the portion between points P4 and P5 is the auxiliary cutting edge 5c for the next corner 3, which after the main cutting edge has been used up is put to use between points P2 and P4 sequentially by suitably turning the indexable cutting bit.

The advantages of this form of main cutting edges in the manner of a polygonal course are that in the region between points P2, P3, the main cutting edge can be reinforced in the installed position by reducing the axial angle as already described in conjunction with FIGS. 12, 13, which leads to an increased cutting edge stability and load-bearing capacity of the tool. The angle of inclination 45 of the main cutting edge that is elevated in the region between points P3 and P4 (over its portion 5a) leads to a smoother course of the tool and to gentler cutting, especially if workpieces that are difficult to cut have to be machined.

The auxiliary or plane cutting edges 5c each retain their function for generating a good surface property in end milling and for making a genuine 90° shoulder in the workpiece. In the region of the corner radii 11, flat cutting edges are present, so that points threatened with breakage are avoided.

The inclined region 9 provided in the applicable corner 3 of the cutting bit as a rule extends on both sides of the bisector of the corner associated with it. It may be formed essentially symmetrically with this angle bisector, but it is often practical for it to be somewhat "twisted" and possibly "tipped" relative to the angle bisector, in order to achieve a differing inclination and length of the two cutting edges that delimit the inclined region on either side of the corner, or in other words the plane cutting edge and the portion adjacent to it of the main cutting edge. Particularly of the inclined region 9 is located in a plane, then in plan view on the cutting bit it is delimited by edges that are located essentially in accordance with the sides of a triangle. If the inclined region 9 is symmetrical with the angle bisector 10 of the corner 3, then the height of this triangle coincides with the angle bisector. As noted, however, it is often practical for the vertical to the side of the triangle opposite the corner 3 to form an acute angle with the angle bisector of the corner 3. This angle may range between 0° and ±60° and is preferably approximately ±15°. The inclined region 9 suitably forms an angle of inclination of between 1.5° and 30°, preferably from 2° to 8°, with the bottom side 1. On the top side 4 of the cutting bit, as mentioned, the inclined region 9 may be delimited by a flat surface that is inclined relative to the bottom side 1, or by at least two oblique surfaces that have the same or a different inclination relative to the bottom side 1. These partial surfaces may for example be formed adjacent one another along a straight line that begins at the corner 3 and is inclined relative to the bottom side 1; it is also conceivable for at least one of the partial surfaces to be tipped around this straight line. An embodiment in which the inclined region 9 on the top side 4 is at least partly delimited by a curved surface, for instance one that is slightly concave or convex, may also have a certain practical importance.

The respective main cutting edge may be formed with its portion located outside the inclined region 9 as at least intermittently essentially parallel to or inclined relative to the bottom side 1. In view of cutting conditions, however, it may be advantageous for the main cutting edge to be formed as a polygonal course with portions of differing inclination relative to the bottom side 1 and/or with optionally differently oriented straight and/or curved portions. It is suitable if the clearance angle of the main cutting edge is smaller than the clearance angle of the plane cutting edge. Moreover, the clearing surface of a corner, associated with the plane cutting edge, may form an angle of preferably 0.2° to 2° with the main cutting edge adjoining it of the adjacent corner, and the clearing surface of the flat cutting edge is then pivoted outward by this angle. Finally, the clearing surface of the portion of the main cutting edge located in the inclined region may have a hemlike region adjacent to the main cutting edge; the hemlike region protrudes laterally past a second clearing surface region extending toward the bottom side and its clearing angle is less than or at most equal to the clearing angle of the second region. The thickness of the hemlike region suitably increases toward the corner. The hemlike region allows compensating for small dimensional errors of the main cutting edge that occur as a result of the beveling in the corner region, if the portion of the main cutting edge located in the inclined region is not oriented precisely parallel to a generatrix of the imaginary cylinder that contains the theoretical circle described by the tool.

The novel cutting bits are inserted into the milling or drilling tool with a positive axial angle and a negative radial angle, in such a way that the portion of the effective main cutting edge located in the inclined region, in the installed position, has a smaller axial angle than the remainder of the main cutting edge, while the associated plane or facing edge is located essentially in a plane that extends at right angles to the axis of rotation. Moreover, this plane or facing edge may also embodied as slightly convex, to attain a smooth cutting action. From practical considerations, the axial angle of the portion of the main cutting edge located in the inclined region is as a rule a few degrees; in principle, the cutting bits may also be installed into the tool body in such a way that this portion of the main cutting edge located in the inclined region works with an axial angle of 0°. In that case, it is assured from the very outset that an accurate 90° shoulder will be created on the workpiece when the plane cutting edge associated with the corner is located in the plane surface.

The exemplary embodiment described relate to ICBs with a square bottom side 1 and four sequentially usable, identically embodied main cutting edges on the four sides of the truncated pyramid base body. The concept of the invention may also, however, be applied to ICBs with a rectangular bottom side; in that case, cutting edges of different lengths are obtained on the sides of the rectangle, and so the cutting bit can be turned only twice. For example, a cutting bit can be used in which only one corner of the polygonal bottom side is formed in accordance with the invention.

We claim:

1. A cutting bit comprising a base body defining a flat bottom side (1);

a top side (4) spaced from the bottom side;

four adjoining sides (2) forming four corners (3) where the sides meet each other, said corners being at least one of rounded and chamfered;

said base body being substantially square in a top view on its top side (4);

peripheral cutting edges formed around said base body and comprising four main cutting edges (5, 5a, 5b) and four facing cutting edges (5c); and chip release and clearing surfaces (40, 18, 20, 25) formed on the top side and on the sides, respectively, of said base body;

said cutting edges being delimited at the top sides and side surfaces by said chip release and clearing surfaces (40, 18, 20, 25), wherein each of said main cutting edges (5a, 5b) and each of said facing cutting edges (5c) extend over at least a portion of a respective one of each of said sides;

said main cutting edges, on each of said sides, extend to a respective corner and substantially around the rounding or chamfer of said corner, and the facing cutting edges of the adjoining side join said main cutting edge at said corner;

said base body, at the top side (4) and adjacent each of said corners (3), is beveled in an outwardly sloping direction to form a delimited region (9) at each corner which is inclined with respect to the bottom side (1);

each (5a) of said main cutting edges (5a, 5b) has a substantially straight portion (5b) which extends into one of said delimited inclined regions (9), said substantially straight portion, at its end, substantially surrounds the at least one rounding and chamfer of the corner associated with said inclined region (9);

wherein each of said facing cutting edges (5c) on the adjacent side of the respective corner essentially adjoins said substantially straight portion (5b) of a respectively adjacent main cutting edge (5a, 5b) to delimit said inclined, delimited region (9) on two of its sides by said substantially straight portion (5b) of said main cutting edge and by said facing cutting edge (5c);

said substantially straight portion of said main cutting edge and said facing cutting edge, at said corner, forming, in top view, an obtuse angle therebetween; and wherein said substantially straight portion (5b) of said main cutting edge has a substantially straight length that is, at its maximum, substantially of the same length as said facing cutting edge (5c).

2. The cutting bit of claim 1, wherein at least one chip release surface (30, 32) associated with at least one of said cutting edges (5a, 5b; 5c) is located on the top side (4).

3. The cutting bit of claim 2, wherein the base body on the top side has a narrow land (29) extending annularly all the way around, which on the cutting edges (5a, 5b; 5c) forms a chip release surface, adjoining said cutter edges on the inside over at least a portion of its length.

4. The cutting bit of claim 3, wherein said land (29), at least intermittently, is oriented parallel to the bottom side (1) of the base body.

5. The cutting bit of claim 2, wherein the inclined region (9) is formed on the top side by an essentially plane surface.

6. The cutting bit of claim 2, wherein the inclined region (9) is formed on the top side by at least two surfaces.

7. The cutting bit of claim 1, wherein the inclined region (9) extends on both sides of the angle bisector (10) of the respective corner (3).

8. The cutting bit of claim 7, wherein the inclined region (9) is formed essentially symmetrically to the angle bisector (10) of the corner (3).

9. The cutting bit of claim 7, wherein the inclined region (9), in top view, is limited by said main and facing cutting edges (5b, 5c, 14), which are located essentially in accordance with sides of a triangle; and wherein the perpendicular (13) to the side (14) of the triangle opposite the corner (3) forms an acute angle with the angle bisector (10) of the corner.

10. The cutting bit of claim 9, wherein the angle (15) is between 0° and ±60°.

11. The cutting bit of claim 9, wherein the angle (15) is approximately ±15°.

12. The cutting bit of claim 1, wherein the inclined region (9) and the bottom side (1) form an angle of inclination of between 1.5° and 30°.

13. The cutting bit of claim 1, wherein the inclined region (9) is formed on the top side by an essentially plane surface.

14. The cutting bit of claim 1, wherein the inclined region (9) is formed on the top side by at least two surfaces.

15. The cutting bit of claim 14, wherein the surfaces are each formed as essentially plane and adjacent one another generally along a straight line of the angle bisector (10) that begins at the corner (3) and is inclined with respect to the bottom side, and at least one of the surfaces is tipped about the straight line with respect to the bottom side (1).

16. The cutting bit of claim 1, wherein the inclined region (9) is delimited on at least the top side (4) and in the region of at least one side, partially by a curved surface.

17. The cutting bit of claim 1, wherein the main cutting edge has an outer portion (5a) located outside the inclined region (9), and said outer portion at least intermittently extends essentially parallel to the bottom side (1).

18. The cutting bit of claim 1, wherein the main cutting edge has an outer portion (5a) located outside the inclined region (9), and said outer portion is essentially inclined, at least intermittently, relative to the bottom side (1).

19. The cutting bit of claim 1, wherein the main cutting edge (5a, 5b) is formed by at least one of a polygonal course with portions of differing inclination relative to the bottom side (1), and differently oriented at least partly straight or curved portions.

20. The cutting bit of claim 19, wherein the main cutting edge (5a, 5b), beginning at a first point (P1) in the vicinity of the corner (3), located in the inclined region, is formed ascendingly relative to the bottom side (1), and defines said substantially straight portion (5b), which portion extends up to a second point (P3) in the vicinity of the delimitation of the inclined region (9), and then adjoining the second point (P3); and wherein said main cutting edge has a second portion (5a) which, up to a third point (P4), is formed descendingly relative to the bottom side (1).

21. The cutting bit of claim 20, wherein said portion (5b) of the main cutting edge, in the first and second portions thereof, is located essentially in a common plane normal to the bottom side (1).

22. The cutting bit of claim 20, wherein the main cutting edge, in the second portion (5a), forms an angle (45) with the bottom side (1) of approximately 1.5° to 8°.

23. The cutting bit of claim 20, wherein, adjoining the third point (P4), the cutting edge is formed in a third portion, forming the facing cutting edge (5c) of the adjacent corner, said third portion ascending relative to the bottom side (1) up to a fourth point (P5) in the vicinity of the perspective corner.

24. The cutting bit of claim 23, wherein adjoining the fourth point (P5), the main cutting edge extends in a fourth portion up to a corner point (P6) in descending manner with respect to the bottom side (1).

25. The cutting bit of claim 20, wherein the facing cutting edge (5c) of one corner and the adjoining portion (5a) of the main cutting edge of an adjacent corner (3) are located in planes perpendicular to the bottom side (1) that form an acute angle (ε), about which the normal plane containing the facing cutting edge (5c) is pivoted inwardly.

26. The cutting bit of claim 25, wherein the angle (ε) is from approximately 0.1° to 6°.

27. The cutting bit of claim 20, wherein the clearing surface (25) of one corner (3), associated with the facing cutting edge (5c), forms an angle of essentially 0.1° to 6° with the clearing surface of the main cutting edge (5a) adjoining it, about which angle the clearing surface (25) of the facing cutting edge (5) is pivoted inwardly.

28. The cutting bit of claim 1, wherein its corners (3) are rounded.

29. The cutting bit of claim 1, wherein all the corners (3) are located in a common imaginary plane parallel to the bottom side (1), which plane is spaced apart from the bottom side (1).

30. The cutting bit of claim 1, wherein the clearance angle of the main cutting edge, at least in the corner region, is smaller than the clearance angle (22) of the facing cutting edge (5c).

31. The cutting bit of claim 1, wherein the clearing surface of at least said portion (5b) of the main cutting edge located in the inclined region (9) has a hemlike region (18) adjacent to the main cutting edge (5a, 5b), which hemlike region protrudes laterally beyond a second clearing surface region (20) extending toward the bottom side, and whose clearance angle is smaller than, or at most equal to, the clearance angle (22) of the second region.

32. The cutting bit of claim 31, wherein the dimension of the hemlike surface clearance region (18)—measured parallel to the bottom side (1)—is increasing toward the corner (3).

33. The cutting bit of claim 1, wherein the base body has main and facing cutting edges (5a, 5b, 5c) adjoining one another in surrounding manner.

34. The cutting bit of claim 1, wherein the length of the portion (5b) of the main cutting edge located in the beveled region is from 15 to 30% of the length of the main cutting edge.

35. The cutting bit of claim 1, wherein the inclined region (9) and the bottom side (1) form an angle of inclination of from 2° to 8°.

36. The cutting bit of claim 1, in combination with a rotary milling tool having a tool body (37) forming a body of rotation, said tool body being formed with bit receiving recesses (38) at the circumference thereof, said bit receiving recesses (38) defining bit receiving seats (39);

said cutting bit has a positive axial angle (44) and a negative axial angle (45), said axial and radial angles, with respect to each other, are such that said portion (5b) of said at least one (5b) of said main cutting edges (5a, 5b) which is located within said delimited inclined region (9) cuts with a smaller axial cutting angle than another cutting edge (5a) of said main cutting edges (5a, 5b), which another cutting edge (5a) is located outside of said portion (5b) and of said delimited inclined region (9); and said at least one facing cutting edge (5c) of said delimited inclined region (9) is located in a theoretical plane (34) which extends at right angle to the axis of rotation of the tool body (37).

37. The combination of claim 36, wherein said portion (5b) of the respective main cutting edge (5a, 5b) located in the inclined region (9) is placed to cut essentially parallel to the pivot axis of the tool body (37), by being positioned with an axial angle of approximately 0°.

\* \* \* \* \*